Figure 1:
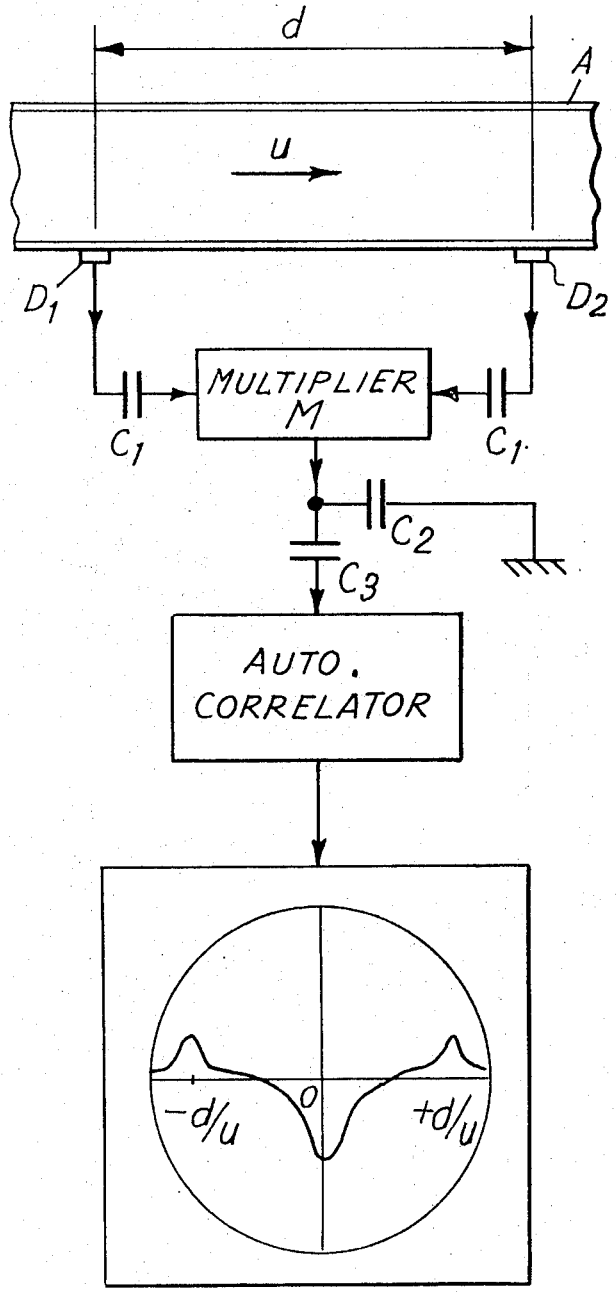

United States Patent [19]
Critten

[11] 3,844,170
[45] Oct. 29, 1974

[54] FLOW VELOCITY MEASUREMENT
[76] Inventor: Donald Louis Critten, Biscot Rd., Luton, England
[22] Filed: Jan. 26, 1973
[21] Appl. No.: 326,720

[30] Foreign Application Priority Data
Jan. 27, 1972   Great Britain ..................... 3942/72

[52] U.S. Cl. ........................... 73/194 E, 235/151.34
[51] Int. Cl. ............................................. G01f 1/00
[58] Field of Search ......... 73/194; 235/151.34, 181; 324/776

[56] References Cited
UNITED STATES PATENTS
| | | | |
|---|---|---|---|
| 3,580,092 | 5/1971 | Scarpa | 73/194 B |
| 3,595,078 | 7/1971 | Beck et al. | 73/194 F |
| 3,636,763 | 1/1972 | Beck | 73/194 E |
| 3,762,221 | 10/1973 | Coulthard | 73/194 E |

Primary Examiner—Charles A. Ruehl
Attorney, Agent, or Firm—Sughrue, Rothwell, Mion, Zinn & Macpeak

[57] ABSTRACT

A method of detecting the velocity of a flow which comprises deriving from each of a first pair of positions spaced apart in the direction of flow a signal corresponding to radiative noise in the flowing system, multiplying said signals together and either auto-correlating the product or cross-correlating the product with the product signal obtained by multiplying together further signals corresponding to radiative noise in the flowing system and derived from each of a second pair of positions spaced apart in the direction of flow.

12 Claims, 2 Drawing Figures

FLOW VELOCITY MEASUREMENT

This invention relates to flow velocity measurement and, in a preferred application, to fluid flow measurement.

Broadly in accordance with the invention there is provided a method of detecting the velocity of a flow which comprises deriving from each of a first pair of positions spaced apart in the direction of flow a signal corresponding to radiative noise in the flowing system, multiplying said signals together and either auto-correlating the product or cross-correlating the product with the product signal obtained by multiplying together further signals corresponding to radiative noise in the flowing system and derived from each of a second a pair of positions spaced apart in the direction of flow.

The resultant correlation functions have peaks which are the result of doppler shifting due to the movement of the flowing system, the extent of the shift being a measure of the mean flow velocity of the system. The mean flow velocity may therefore be measured directly from the spacing between the peaks.

The invention also provides a flow meter comprising means for deriving from each of a pair of positions spaced apart in the direction of flow a signal corresponding to radiative noise in the flowing system, a multiplier for multiplying the signals together and means for auto-correlating the product.

In an alternative embodiment, the flow meter comprises means for deriving from a first pair of positions spaced apart in the direction of flow a respective first pair of signals corresponding to radiative noise in the flowing system, means for deriving from a second pair of positions spaced apart in the direction of flow a respective second pair of signals corresponding to radiative noise in the flowing system, a first multiplier for multiplying together said first pair of signals, a second multiplier for multiplying together said second pair of signals, and a cross-correlator for cross-correlating the product signals from said first and second mutipliers.

In the case where two pairs of signals are derived for cross-correlation, the positions from which the second pair of signals are derived are preferably in different locations along the line of flow from those from which the first pair of signals are derived. It is also preferred that the spacing between the second pair of positions is equal to the spacing between the first pair of positions.

The system whose flow velocity is to be measured may comprise for example a single or multi-phase system whose flow is constrained as in a duct such as a pipe or conduit, e.g., a slurry, a gas or a liquid, or it may be unconstrained e.g., as in an oil gusher, a fountain, a volcano fumarol or other unconstrained fluid. The system may also comprise a stream of discrete units, e.g. road traffic.

The invention may be more readily understood from the following description, given by way of example only, of a flow meter in accordance with the invention as applied to the measurement of a fluid in a duct.

The flow meter, which utilizes the auto-correlation aspect of the invention, is shown schematically in FIG. 1 of the accompanying drawings.

Figure 2:
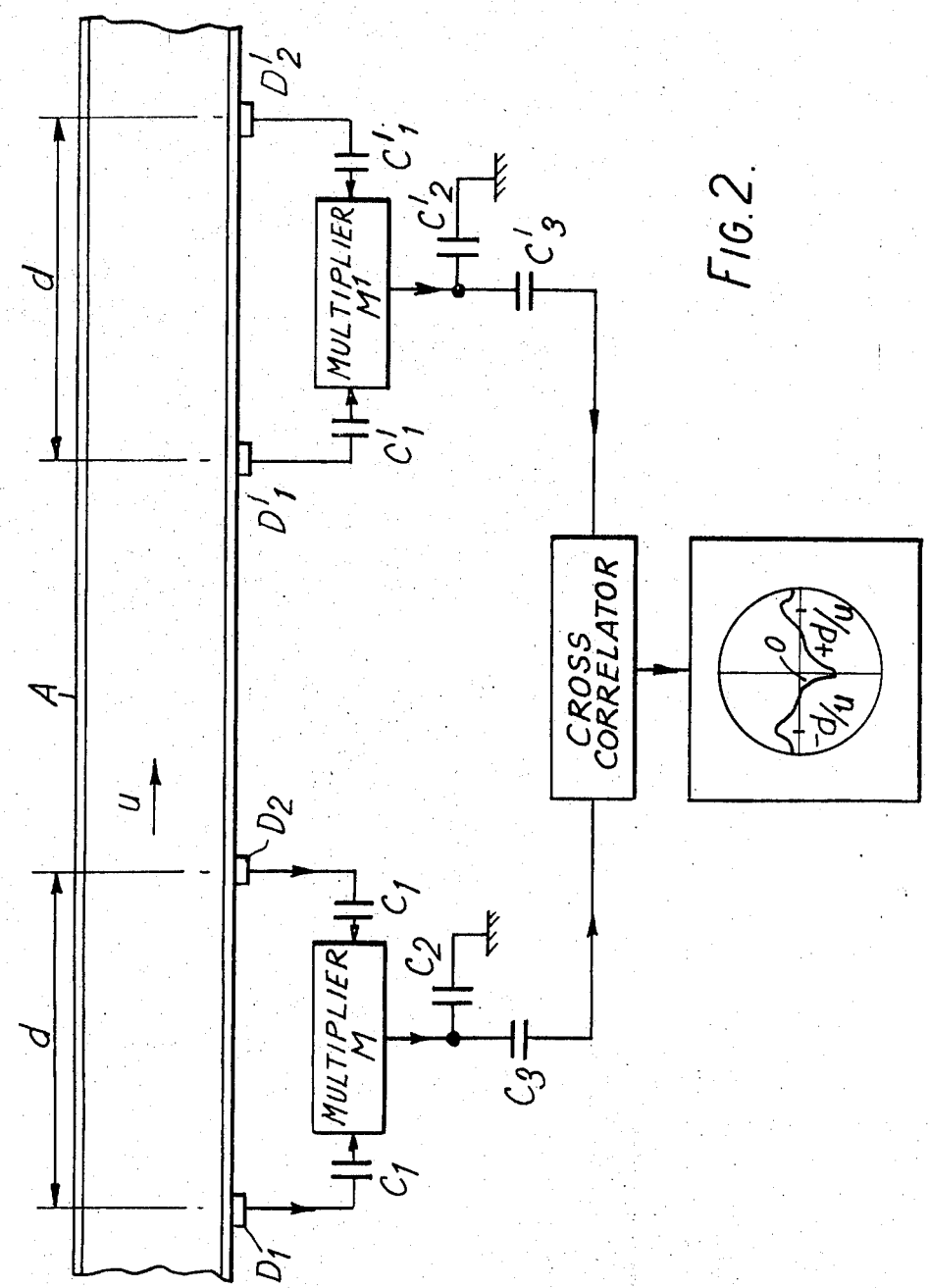

FIG. 2 illustrates an alternative embodiment utilizes a cross-correlator.

FIG. 1 of the drawings shows a duct A in longitudinal section, the duct having a fluid flowing therealong at a mean velocity $u$ in the direction illustrated by the arrow. A flow meter for measuring the flow velocity comprises a pair of acoustic-to-electric transducers $D_1$ and $D_2$ attached to the duct walls by means not shown at a distance $d$ apart and each having an output connected via a respective filter capacitor $C_1$, whose function is described hereinafter, to a respective input of a multiplier circuit M. The product output of the multiplier is connected via a filter consisting of the capacitors $C_2$ and $C_3$ to the input of an auto correlator. If required, the auto correlator output, i.e., the product signal auto correlation function, may be displayed, e.g., as shown in the accompanying drawing where any spurious peaks that may occur have been omitted for the sake of clarity.

The manner in which this flow meter operates, and the theory which is believed to explain its operation, will now be outlined.

In any turbulently flowing fluid system, acoustic disturbances will be generated by random fluctuations at various points in the flow and these disturbances may be propagating or non-propagating. In other words, acoustic radiation will either travel indefinitely along the flow, or it will decay in amplitude as it travels along the flow. The non-propagating disturbances, which decay exponentially, and the propagating disturbances, both propagate themselves acoustically in the flow at a velocity $>> u$ such that they are detected nearly instantaneously by the transducers $D_1$ and $D_2$. Such fluctuations may be thought of as being composed of sets of events, each set consisting of an infinite series of Fourier components and each set being characterized by an event duration T. To a first approximation, the principal Fourier component is directly related to 1/T, having an angular frequency $\omega = 1/T$. The outputs of the transducers $D_1$ and $D_2$ each contain information relating to large numbers of fluctuations occurring in the flow, both between the transducers and beyond them.

Now, provided that $T >> d/c$, where $c$ is the velocity of sound in the flowing fluid, i.e., provided the acoustical signals propagated by fluctuations occurring between the two transducers are substantially coherent at the two transducers, integration of the acoustic radiation from random fluctuations in the flow between the transducers produces signals at the outputs of the transducers $D_1$ and $D_2$ having components due to the individual angular frequencies $\omega$ offset to values $(\omega + \Delta \omega)$ for the downstream transducer and $(\omega - \Delta \omega)$ for the upstream transducer by doppler shifting due to the movement of the fluid. The $\omega$ components can be removed by multiplying together the two signals to form a coherent product, which, when auto correlated, has three values of delay $\Delta t$ producing auto correlation peaks, viz. when the correlation delay is 0 or $+d/u$. Thus, the spacing between these peaks is a direct measure of the mean fluid flow velocity.

Acoustic radiation from the entire volume of fluid between the transducers is detected by them, and an averaging effect of small flow profile irregularities is therefore obtained.

As mentioned before, the transducers $D_1$ and $D_2$ also receive acoustic radiation from turbulent fluctuations occurring outside of the space between the transducers. However, the multiplier output due to such radiation is either high frequency, incoherent, or D.C. and is mostly filtered out by the capacitor $C_3$.

The value of the capacitors $C_1$ may be selected such that $\Delta t > T$, whereby cross correlation between signals uncorrelated in space and time can be ignored. If $\Delta t > T$, a random variable may be auto correlated in the flow meter, which would give a non-zero result.

By suitably choosing the value of the capacitors $C_1$ and by adding the high frequency filter $C_2$, practical values of d, e.g., in the order of one duct diameter, but preferably not less than 10 cms, can be obtained over a frequency range of the order of one decade for the detection of air-propagated sound.

If $d$ is chosen such that $T < d/c$ or $T \sim d/c$, the display shown in the drawing may have other peaks between those shown, and this may lead to difficulty in selecting the correct peaks.

It is desirable for the frequency band used to be wide enough and of suitable value to prevent the peak at $\Delta t=0$ from interfering with the peaks at $+ d/u$.

An example of how circuit parameter values can be calculated for a particular application in which air flows through the duct is given below.

Suppose $d = 33$cm, $c = 3.3 \times 10^4$ cm/sec and therefore, $d/c = 10^{-3}$ sec. T. min, the minimum event duration fluctuation to be catered for, can then be set to ½ $d/u$ max, where $u$ max is the maximum value of $u$ to be catered for, and therefore, if $u$ max $= 0.1c$ for the application, T max $= ½ \cdot 10^{-2} = 1/200$. The value of the filter capacitors $C_1$ is therefore selected so as to stop frequencies below 200 Hz. Significant incoherence will occur when $d/c \sim 1/f$, i.e., at a frequency of 1kHz. Also, the high frequency product of 200Hz radiation will be 400Hz so that the value of the filter capacitor $C_2$ may be selected so as to stop frequencies somewhere between 400Hz and 1kHz, as an example.

It can be taken that:
$\bar{u}/1 = 2\pi f'$ where
$\bar{u}$ = turbulent means fluctuation velocity;
1 = mean even length; and
$f'$ = the lowest frequency used.

Therefore, if $\bar{u} \sim 0.1u$, $u \sim 300$ cm/sec and 1 max $\sim$ 0.2cm. Consequently, $1/d \gg 1$, i.e., the radiation is effectively from point sources, which ensures satisfactory detection.

The capacitor $C_3$ prevents the DC component of single unwanted frequencies from being passed to the auto correlator and disrupting correlation of the signals resulting from acoustic pressure fluctuations.

It will be noted that, in the arrangement described, the transducers $D_1$, $D_2$ are mounted on the outside wall of the duct. Although they could, instead, be mounted in the fluid, this external arrangement is advantageous in that it does not obstruct fluid flow. A particular advantage is that the flowmeter can be arranged in a "stick-on" or "clamp-on" form: it is simply attached to the wall of a duct at any desired position so as to give a flow reading at that position. Such an arrangement, as will be apparent, is very advantageous, as a single flow meter can be used to monitor flow at a variety of places in an installation.

In the arrangement described, the flowmeter relies on the acoustic noise generated from the random fluctuations in the fluid flow due to turbulence. It will be appreciated, however, that in most industrial applications additional time-random radiation will be present in the flowing system due to external sources e.g., pumps and other machinery and that such injected radiation may also be utilized in accordance with the invention. In some circumstances, it may even be desirable to deliberately inject time-random radiation into the system for detection by the flowmeter. Such radiation will preferably be at frequencies of not less than 100 Hz.

Whereas the flowmeter that has been described is for the purpose of measuring flow within a duct, the flowmeters of the invention may also be employed for remote flow measurement, e.g., of an unconfined flow such as a fountain, an oil gusher or a volcano fumerol.

Each element of such a flow, which may be moving at, say, 25–50 m/sec, acts as an acoustic source and radiates sound into the surrounding atmosphere. Consequently, if the transducers of the flow meter have their input parts directed towards the flow and mutually spaced apart in the direction of the flow, an auto correlation function having the doppler-shifted peaks described above can be obtained.

A modified form of the flow meter described above can be used to measure fluid flow by the detection of electromagnetic rather than acoustic radiated noise. Each transducer $D_1$, $D_2$ is replaced by an electrical pick-up means such as an aerial and amplifier, the remainder of the circuit being substantially as shown. Such a flow meter could be used, for example, to measure the velocity of a plasma flow.

As briefly mentioned before, the flow meter described can be modified as illustrated in FIG. 2 of the accompanying drawings by the provision of a second pair of transducers $D_1'$ and $D_2'$ located at a second pair of positions spaced apart along the flow. The spacing between these transducers is equal to that between transducers $D_1$ and $D_2$. The signals from these transducers are connected via filter capacitors $C_1'$ to respective inputs of a second multiplier M', and the product from this multiplier is connected via a filter comprising the capacitors $C_2'$ and $C_3'$ to an input of a cross-correlator for cross-correlation with the product from the multiplier M. If required, the product of the cross-correlator may be displayed, e.g., as illustrated where any spurious peaks that may occur have been omitted for the sake of clarity.

Although a presently preferred application of the invention is to the measurement of fluid flow, the invention may also be applied to the measurement of the velocity of other types of flow, e.g., the flow of a stream of discrete units such as traffic flow. In such an application, the transducers may be placed alongside a road and the apparatus used to detect the mean traffic velocity. Suitably, the information may be used to control traffic signals in accordance with the measured mean velocity of traffic flow.

The flow meters described enable accurate measurement of the velocity of a turbulent fluid flow, and, if desired, such measurement can be obtained without contact or interference with the fluid.

I claim:

1. A method of detecting the velocity of a flow which comprises deriving from each of a first pair of positions spaced apart in the direction of flow a signal corresponding to radiative noise in the flowing system, multiplying said signals together and auto-correlating the product.

2. A method as claimed in claim 1 in which the flow is that of a system constrained within a duct.

3. A method as claimed in claim 1 in which the radiative noise comprises acoustic radiation generated by random fluctuations in a flowing fluid system.

4. A flow meter comprising means for deriving from each of a pair of positions spaced apart in the direction of flow a signal corresponding to radiative noise in the flowing system, a multiplier for multiplying the signals together, and means for auto-correlating the product.

5. A flow meter as claimed in claim 4 in which the means for deriving the signals corresponding to radiative noise in the flowing system are acoustic-to-electric transducers.

6. A flow meter as claimed in claim 4 adapted to measure flow of a system constrained within a duct.

7. A flow meter comprising means for deriving from a first pair of positions spaced apart in the direction of flow a respective first pair of signals corresponding to radiative noise in the flowing system, means for deriving from a second pair of positions spaced apart in the direction of flow a respective second pair of signals corresponding to radiative noise in the flowing system, a first multiplier for multiplying together said first pair of signals, a second multiplier for multiplying together said second pair of signals, and a cross-correlator for cross-relating the product signals from said first and second multipliers.

8. A flow meter as claimed in claim 7 in which the means for deriving the signals corresponding to radiative noise in the flowing system are acoustic-to-electric transducers.

9. A flow meter as claimed in claim 7 adapted to measure flow of a system constrained within a duct.

10. A method of detecting the velocity of a flow which comprises deriving from each of a first pair of positions spaced apart in the direction of flow a signal corresponding to radiative noise in the flowing system, multiplying said signals together and cross-correlating the product with the product signal obtained by multiplying together further signals corresponding to radiative noise in the flowing system and derived from each of a second pair of positions spaced apart in the direction of flow.

11. A method as claimed in claim 10 in which the flow is that of a system constrained within a duct.

12. A method as claimed in claim 10 in which the radiative noise comprises acoustic radiation generated by random fluctuations in a flowing fluid system.

* * * * *